(12) United States Patent
Kawase et al.

(10) Patent No.: US 6,839,475 B2
(45) Date of Patent: Jan. 4, 2005

(54) OPTICAL CONNECTION COMPONENT

(75) Inventors: Ritsu Kawase, Shizuoka (JP); Ken Sukegawa, Shizuoka (JP); Tatsushi Kobayashi, Shizuoka (JP); Koichi Arishima, Tokyo (JP); Mamoru Hirayama, Tokyo (JP)

(73) Assignees: Tomoegawa Paper Co., Ltd., Tokyo (JP); Nippon Telegraph and Telephone Corporation, Tokyo (JP)

( * ) Notice: Subject to any disclaimer, the term of this patent is extended or adjusted under 35 U.S.C. 154(b) by 167 days.

(21) Appl. No.: 10/258,438

(22) PCT Filed: Apr. 26, 2001

(86) PCT No.: PCT/JP01/03612
§ 371 (c)(1),
(2), (4) Date: Oct. 24, 2002

(87) PCT Pub. No.: WO01/84194
PCT Pub. Date: Nov. 8, 2001

(65) Prior Publication Data
US 2003/0138187 A1 Jul. 24, 2003

(30) Foreign Application Priority Data
Apr. 27, 2000 (JP) ........................ 2000-126802

(51) Int. Cl.$^7$ ................................. G02B 6/12
(52) U.S. Cl. ........................ 385/14; 385/137
(58) Field of Search ............... 385/24, 31, 76, 385/114

(56) References Cited

U.S. PATENT DOCUMENTS

| | | | | |
|---|---|---|---|---|
| 4,355,865 A | * | 10/1982 | Conrad et al. ............... | 385/114 |
| 4,360,384 A | * | 11/1982 | McKaveney et al. ...... | 106/1.12 |
| 4,770,490 A | * | 9/1988 | Gruenewald et al. ....... | 385/100 |
| 4,936,649 A | * | 6/1990 | Lymer et al. ................. | 385/13 |
| 5,204,925 A | | 4/1993 | Bonanni et al. | |
| 5,292,390 A | | 3/1994 | Burack et al. | |
| 5,970,191 A | * | 10/1999 | Oba et al. ..................... | 385/47 |
| 6,011,887 A | * | 1/2000 | Kamei et al. ............... | 385/103 |
| 6,075,911 A | * | 6/2000 | Goto ............................ | 385/31 |
| 6,195,495 B1 | | 2/2001 | Ota et al. | |
| 6,350,397 B1 | * | 2/2002 | Heikkila et al. .............. | 264/39 |
| 6,547,445 B2 | * | 4/2003 | Kiani ........................... | 385/53 |
| 6,579,737 B2 | * | 6/2003 | Yoneda et al. ................ | 438/22 |
| 6,655,433 B1 | * | 12/2003 | Hirayama et al. .......... | 156/436 |
| 6,681,068 B2 | * | 1/2004 | Goto et al. .................... | 385/49 |
| 6,711,322 B1 | * | 3/2004 | Kohda et al. ................. | 385/22 |

FOREIGN PATENT DOCUMENTS

| | | |
|---|---|---|
| EP | 0669200 A1 | 8/1995 |
| EP | 0816882 A2 | 1/1998 |
| JP | 2574611 | 10/1995 |
| JP | 9-244536 A | 9/1997 |
| JP | 10-237400 A | 9/1998 |
| WO | 99/46621 A1 | 9/1999 |

* cited by examiner

Primary Examiner—Ellen E. Kim
(74) Attorney, Agent, or Firm—McDermott Will & Emery LLP

(57) ABSTRACT

The present invention provides an optical interconnection apparatus free from attaching, fixing or adhering when come into contact with each other or with another material, and easy to handle. The optical interconnection apparatus according to the invention comprises a substrate (1), a protective resin layer (2) composed of a silicone based rubber-like or gel-like material on one side or both sides of said substrate, and plural optical fibers (4) which are routed two-dimensionally routed on the substrate and provided at ends thereof with end portions (5) adapted to permit optical interconnections, and said optical fibers being held in place by said protective resin layer, wherein a non-tacky surface layer (8) is provided on the surface of said protective resin layer. The non-tacky surface layer is preferred to be composed of a silicone-based material and having a kinetic friction coefficient of 3.0 or less.

9 Claims, 2 Drawing Sheets

OPTICAL CONNECTION COMPONENT

TECHNICAL FIELD

This invention relates to optical interconnection apparatus (optical circuit board connectors) for mutually connecting optical component, parts and/or devices used in optical communications or optical information processing, such as optical elements, optical circuit packs and optical circuit devices.

BACKGROUND ART

To permit optical interconnections between plural optical components in an optical circuit pack or optical interconnections between plural optical circuit packs or between optical circuit devices on each of which optical circuit packs are mounted, these optical components, optical circuit packs and optical circuit devices are provided at terminals thereof with optical connectors to interconnect them together via optical fibers. As these optical fibers have to be arranged with slacks in this case, it is a current practice that, on an optical circuit pack or inside and/or on a back side of an optical circuit devices, intricately routed lines of the optical fibers extend overlapping one another in the form of a bird's nest and hence occupy a large space. For an optical interconnection process which is complex and requires a large space as descried above, a proposal has been made, as a simple process anywhere routing of optical fibers on a two-dimensional plane as desired. And it has been proposed an optical interconnection apparatus using a sheet or substrate with a pressure-sensitive adhesive coated thereon to hold optical fibers in place by the pressure-sensitive adhesive as disclosed, for example, in JP 2,574,611 B.

Incidentally, the optical interconnection apparatus disclosed in JP 2,574,611 B is obtained in such a way that upon its fabrication, optical fibers are located by a pressure-sensitive adhesive on a substrate (base layer) or on fiber jackets, to form a routing pattern and the routing pattern is then covered with the same material as the material used for the substrate, whereby a protective layer is formed. This process is however accompanied by problems in that as optical fibers so located increase in number and the optical fibers increase more overlapped portions (cross-over routing) in the routing pattern so formed, the resulting routing layer of the optical fibers becomes thicker and, because the tacky surface with which the optical fibers are in contact becomes smaller at the overlapped portions of the optical fibers, the protective layer cannot be arranged evenly. There is a further problem in that at the overlapped portions of the optical fibers in the routing pattern, the fixing force by the pressure-sensitive adhesive becomes weaker and the optical fibers are allowed to move, thereby resulting in displacements in the routing pattern (a loss in the intactness of the routing pattern). The displacements in the routing patterns causes optical loss because of increased possibility of microbending of the optical fibers. Furthermore, when the fixing force by the pressure-sensitive adhesive becomes weak, the optical circuit board becomes extremely weak to breakage which may be caused by deformation such as bending.

In order to solve these problems, it has been attempted to form a protective resin layer on the optical fibers routed on the adhesive layer with a silicone based rubber-like or gel-like material in a fluid state so as to hold the optical fibers intricately routed in place. In such a case, the above-mentioned problems, for example, reduction of fixing force in the overlapped portions of the optical fibers, displacements in the routing pattern, optical loss by microbending of the optical fibers, destruction caused by deformation such as bending can be solved. However, there is another problem that the silicone rubber-like or gel-like material causes attaching, fixing or adhering to the surface of, for example, metal, glass, high polymer (plastic), etc. by its characteristic of tackiness, whereby it becomes impossible to move in the optical interconnection apparatus. Furthermore, there are problems because of its tackiness, that when plural optical interconnection apparatus are piled up upon storage, mounting or transportation, they adhere each other on their surfaces, thereby they being difficult to separate them, and that dust or other substance adheres on the surface of the optical circuit board, when it was installed in a rack or a board. That is, when optical interconnection apparatus is installed in a very narrow space such as in a rack or a board, working efficiency became bad because of its tackiness to result in a problem of being hard to use.

Moreover, since the surface of the formed protective resin layer composed of a silicone based rubber-like or gel-like material is easily broken and damaged, there is a problem of surface scratches when the optical interconnection apparatus is installed in a very narrow space such as in a rack or a board.

DISCLOSURE OF THE INVENTION

The present invention has been completed with a view to resolving various problems of the conventional art such as those described above. Described specifically, an object of the present invention is to provide an optical interconnection apparatus free from attaching, fixing or adhering when came into contact with each other or with another material, and easy to handle. Another object of the present invention is to provide an optical interconnection apparatus having high flexibility and being easy to handle which makes it possible to readily interconnect optical components such as optical elements, optical circuit packs, optical circuit devices, etc.

A first aspect of the optical interconnection apparatus according to the present invention, which has a substrate, comprises a substrate, a protective resin layer composed of a silicone based rubber-like or gel-like material on one side or both sides of said substrate, and plural optical fibers which are two-dimensionally routed on the substrate so as to form a routing pattern having at least a crossing part, a curved part or a fiber pitch changing part and provided at ends thereof with end portions adapted to permit optical interconnections, and said optical fibers being held in place by said protective resin layer, wherein a non-tacky surface layer having a kinetic friction coefficient of 3 or less is provided on the surface of said protective resin layer. In an embodiment of the first aspect, it is possible to prepare an optical interconnection apparatus having plural substrates by laminating a protective resin layer formed on a substrate with another protective resin layer formed on another substrate via an adhesive layer.

A second aspect of the optical interconnection apparatus according to the present invention, which has no substrate, comprises at least two protective resin layers composed of a silicone based rubber-like or gel-like material and plural optical fibers which are two-dimensionally routed so as to form a routing pattern having at least a crossing part, a curved part or a fiber pitch changing part and provided at ends thereof with end portions adapted to permit optical interconnections, and said optical fibers being held in place by at least one of said protective resin layers, wherein a non-tacky surface layer having a kinetic friction coefficient of 3 or less is provided on the surface of each of said protective resin layers. In an embodiment of the second aspect, each of said protective resin layers may be laminated via an adhesive layer, too.

In the first and second aspects of the optical interconnection apparatus according to the present invention, the non-tacky surface layer is preferred to be composed of a silicone based material. A protective resin layer can be prepared by arranging an edge-dam member along or in a vicinity of a peripheral edge of a substrate, a release film or another protective resin layer, filling the inside of the edge-dam member with a silicone rubber-like or gel-like material, and solidifying it.

Figure 1:
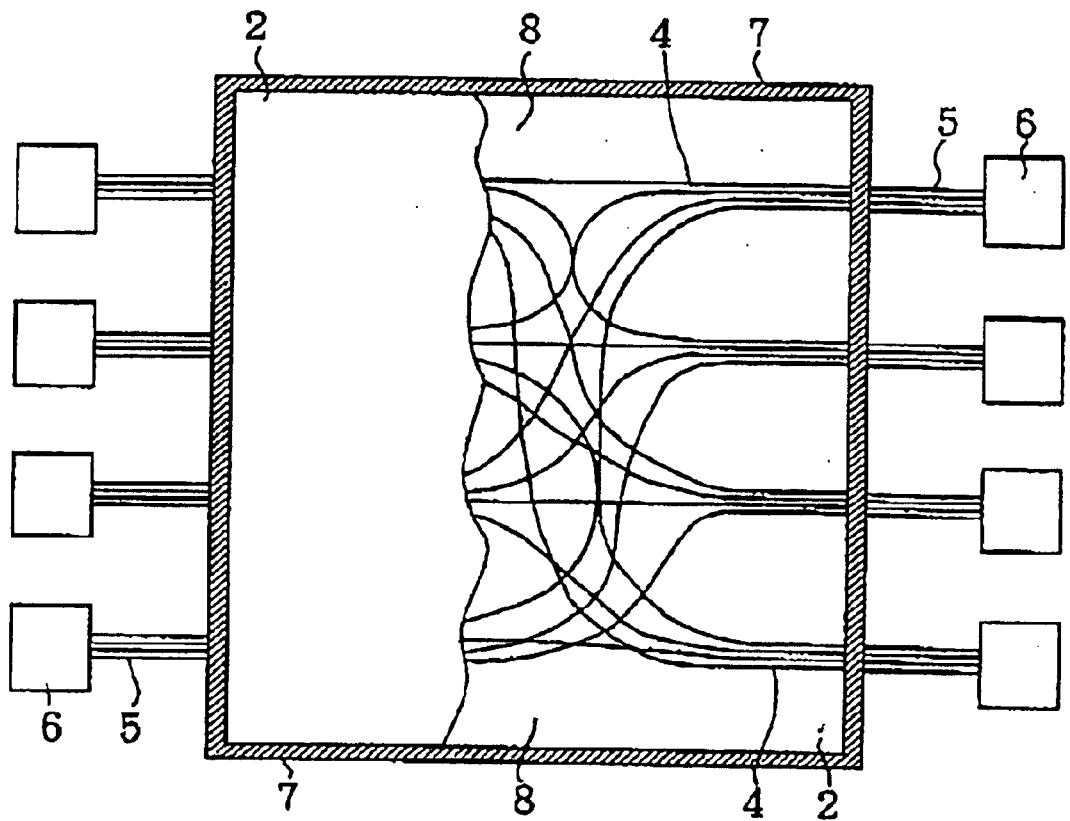
FIG. 1 is a partly cut-away top plan view of an illustrative optical interconnection apparatus according to a first aspect of the present invention.

In the drawings, 1 is a substrate, 2 and 2a each is a protective resin layer, 3 and 3a each is an adhesive layer, 4 is an optical fiber, 5 is an end portion, 6 is an optical component, 7 is an edge-dams, and 8 and 8a each is a non-tacky surface layer.

BEST MODES FOR CARRYING OUT THE INVENTION

Referring to the drawings, embodiments of the present invention will hereinafter be described in detail.

Figure 2:
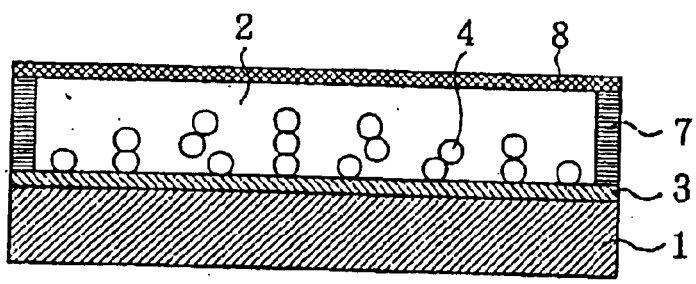
FIG. 2 is a cross-sectional view of FIG. 1.

In FIG. 1 and FIG. 2, plural optical fibers 4 are routed on a substrate 1 which has a two-dimensional plane via an adhesive layer 3. These optical fibers 4 are held in place and protected by a protective resin layer 2 having flexibility composed of a silicone based rubber-like or gel-like material. A non-tacky surface layer 8 is provided on the protective resin layer 2. Opposite ends of the optical fibers 4 are formed into end portions 5 adapted to permit optical interconnections. Optical components 6, for example, optical connectors are interconnected to the end portions. The end portions 5 may be formed in a body with the optical components 6. 7 is an edge-dam which is arranged for forming the protective resin layer.

Figure 3:
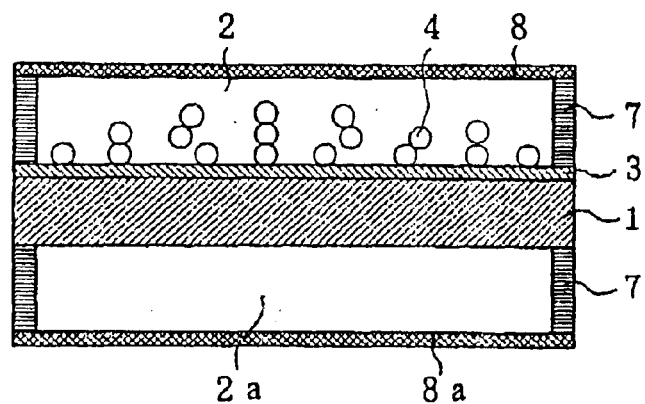
FIG. 3 is another cross-sectional view of an optical interconnection apparatus of the first aspect according to the present invention.

In FIG. 3, a protective resin layer 2a is provided on the back of the substrate 1, and a non-tacky surface layer 8a is formed on the surface of the protective resin layer 2a.

Figure 4:
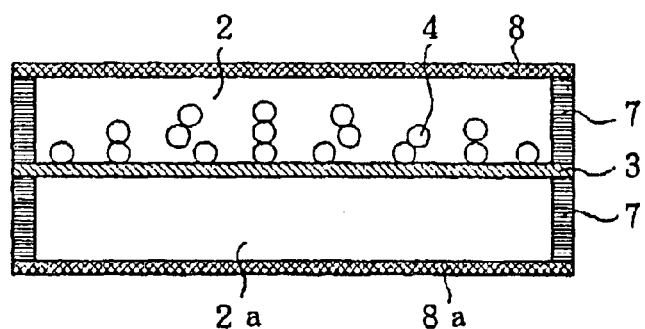
FIG. 4 is a cross-sectional view of an optical interconnection apparatus of the second aspect according to the present invention.

In FIG. 4, plural optical fibers 4 are routed on a protective resin layer 2a having flexibility via an adhesive layer 3, and they are covered with a protective resin layer 2 having flexibility. Further, non-tacky surface layers 8 and 8a are formed on these protective resin layers 2 and 2a, respectively.

Figure 5:
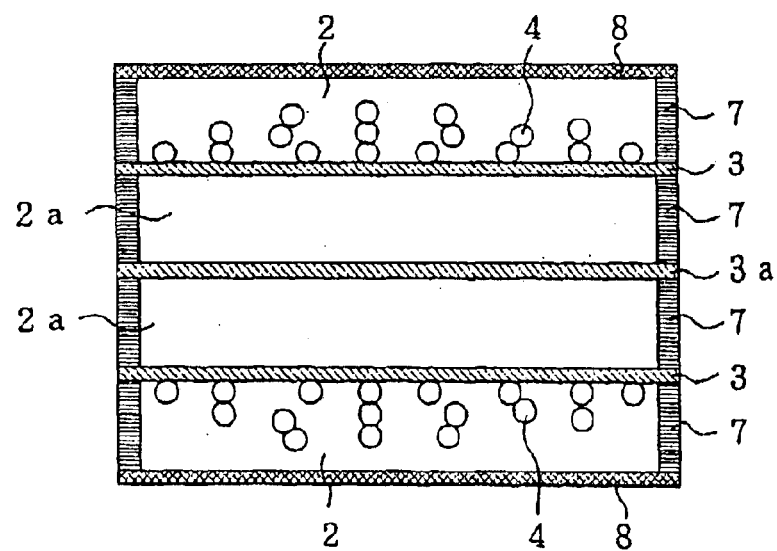
FIG. 5 is another cross-sectional view of an optical interconnection apparatus of the second aspect according to the present invention.

In FIG. 5, an optical interconnection apparatus having four protective resin layers and two optical fiber layers is shown, which is produced using two parts before forming the non-tacky surface layers 8 and 8a in production of the optical interconnection apparatus of FIG. 4, stacking these two parts so as to face the protective resin layers 2a and 2a via an adhesive layer 3a, and forming then non-tacky surface layers 8 and 8 on each of the protective resin layers 2 and 2, respectively.

In the optical interconnection apparatus according to the present invention, no particular limitation is imposed on the substrate having a two-dimensional plane for supporting the routed optical fibers thereon. For example, any substrate is usable insofar as it is employed in general electronic parts or electrical parts, such as glass-epoxy resin composite substrates, polyester films, polyimide films, and gel-like, rubber-like or porous organic materials such as silicone or polyurethane, etc., which may be of any shape. The substrate is not required to have flexibility but is stiff depending on its application purpose, though it is preferred to have a certain degree of flexibility. It is accordingly possible to use a stiff polymer substrate, a ceramic substrate or the like.

Optical fibers to be routed in the present invention can be suitably selected and used depending on the application purpose of the optical interconnection apparatus. For example, silica- or plastic-made single-mode optical fibers, multiple-mode optical fibers or the like can be used preferably. Carbon-coated optical fibers can also be suitably used as the optical fibers.

As a routing method for optical fibers in the present invention, it is most convenient to route them by providing an adhesive layer on a film substrate. Nonetheless, a suitable method may be selected for the routing of optical fibers depending on the application purpose. It is only necessary to route optical fibers such that they are provided at both ends thereof with end portions adapted to permit interconnections. For example, it is possible to route optical fibers by arranging projecting members, recessed members or the like on a film substrate or by providing outer surfaces of the optical fibers with adhesive layers.

As an adhesive for forming adhesive layers to route optical fibers, any adhesive can be used insofar as it has adhesiveness sufficient to retain the pattern of the optical fibers in response to tensions which may be produced when the routed optical fibers are bent. Usable examples can include various pressure-sensitive adhesives (adhesives), thermoplastic adhesives and thermosetting adhesives, such as urethane-base adhesives, acrylic adhesives., epoxy adhesives, nylon-base adhesives, phenol-base adhesives, polyimide-base adhesives, vinyl adhesives, silicone-base adhesives, rubber-base adhesives, fluorinated epoxy adhesives and fluorinated acrylic adhesives. From the standpoint of easiness in routing optical fibers, pressure-sensitive adhesives and thermoplastic adhesives are used preferably.

In the present invention, silicone based gel-like or rubber-like materials excellent in reliability, stress relaxation, heat resistance, cold resistance, moisture resistance, chemical resistance, electric insulation and flexibility, which have been practically used as sealing materials for semiconductor devices, can be used as the resins for composing the protective resin layers having flexibility. Namely, the protective resin layers are produced using a silicone-based material which hardens to be in a gel-like or rubber-like state. More specifically, addition reaction type silicone gel, condensation reaction room temperature vulcanizing type silicone rubber, addition reaction type thermosetting silicone rubber, addition reaction room temperature vulcanizing type silicone rubber, UV curing type silicone rubber, etc. can be used.

As a material for composing the non-tacky surface layer, any material can be used insofar as it adheres to the silicone based rubber-like or gel-like material of the protective resin layer and forms a film which reduces tackiness, adhesion, sticking tendency of the silicone based rubber-like or gel-like material by drying or curing at room temperature or with heat. No particular limitation is imposed on the kind thereof. However, the non-tacky surface layer is preferred to be formed of a silicone-based material. Furthermore, the non-tacky surface layer may contain a filler.

In the case that the non-tacky surface layer does not contain a filler in the present invention, silicone resin, fluorine contained resin, urethane resin, olefin resin, polystyrene resin, acrylic resin, etc. can be used for composing the non-tacky surface layer. These resins may be suitably selected to use as a composite material. In the present invention, a curable silicone resin composition is the most suitably used.

In a detailed explanation about the non-tacky surface layer which is composed of the curable silicone resin composition, a silicone resin having reactive groups which cause a condensation reaction in the molecule can be used as the silicone resin in the curable silicone resin composition. Examples of the condensation reaction group include hydroxyl group (silanol group), alkoxy group such as methoxy group and ethoxy group, and oxime group, which attached to the silicon atom.

Examples of preferred silicone resin include those which are composed of at least a siloxane unit represented by the formula $RSiO_{3/2}$ and a siloxane unit represented by the formula $R_2SiO_{2/2}$ and have the above-mentioned reactive groups attached to the silicon atom. In the above-mentioned formula, each R, which is the same or different each other, represents a $C_1$–$C_{10}$ monovalent hydrocarbon group such as alkyl group, for example, methyl, ethyl, propyl, etc., alkenyl group, such as vinyl, allyl, butenyl, etc., aryl group such as phenyl, tolyl, etc., and halogenated alkyl group such as 3,3,3-trifluoropropyl, etc. Specific examples of such silicone resins include methylsilicone resin, methylphenylsilicone resin, methylvinylsilicone resin, etc. Of these, methylphenylsilicone resin is the most suitable because of its excellent film strength of the non-tacky surface layer.

The curable silicone resin composition may contain a cross-linking agent and a cross-linking accelerator in addition to the above-mentioned silicone resin. It may also contain an adhesion promoter for improve adhesive strength to the protective resin layer.

Specific examples of the cross-linking agent capable of using in the present invention include alkoxysilanes such as methyltrimethoxysilane, dimethyldimethoxysilane, vinyltrimethoxysilane, phenyltrimethoxysilane, diphenyldimethoxysilane, methyltriethoxysilane, dimethyldiethoxysilane, phenyltriethoxysilane, diphenyldiethoxysilane, etc., and oximesilanes such as methyltris(methylethylketoxime)silane, dimethyl-bis(methylethylketoxime)silane, phenyl-tris(methylethylketoxime)silane, vinyl-tris(methylethylketoxime)silane, diphenyl-bis(methylethylketoxime)silane, etc. These silanes can be used as a mixture of two or more thereof.

Specific examples of the cross-linking accelerator capable of using in the present invention include diethylenetriamine, triethylenetetramine, tetraethylenepentamine, dibutyl tin dioctoate, dibutyl tin diacetate, dibutyl tin dilaurate, tin naphthenate, tin octoate, iron octoate, zinc octoate, tetrabutyl orthotitanate, tetra-isopropyl orthotitanate, ethylacetoacetate aluminum di-isopropylate, aluminum tris(ethylacetate), etc.

Moreover, as the above-mentioned adhesion promoter, various kinds of silanes such as γ-glycidoxypropyltrimethoxysilane, γ-methacryloxypropyltrimethoxysilane, γ-aminopropyltriethoxysilane, etc. and partially hydrolysis products of them. These compounds may be added by suitably choosing depending on the application purpose.

The non-tacky surface layer in the present invention may have a composition containing a filler in the base component. Examples of the base component in such a case include resin materials and rubber materials, such as silicone type, fluorine-contained type, urethane type, epoxy type, modified silicone type, acrylic type and olefin type resin or rubber. However, it is desirable to use a silicone type or modified silicone type resin or rubber in the viewpoint of adhesion to the protective resin layer.

Specific examples of preferable base component in the present invention include a curable silicone resin composition and a silicone rubber composition. As the curable silicone resin composition, the above-mentioned materials are usable. As the silicone rubber composition, it is capable of using, for example, an addition reaction type curable silicone rubber composition which comprises alkenyl group contained organopolysiloxane, organohydrogen polysiloxane and a platinum type catalyst as indispensable ingredients and which causes cross-linking at room temperature by addition reactions to produce a silicone rubber; a condensation reaction type curable silicone rubber composition which comprises silanol, or silane or siloxane having hydrolytic groups attached to the Si atom thereof, and a catalyst for accelerating the condensation reaction, such as organotin compound or organotitanium compound, etc. as indispensable ingredients, and which causes cross-linking by condensation reactions to produce a silicone rubber; and an organic peroxide type curable silicone rubber composition which comprises alkenyl group contained organopolysiloxane and an organic peroxide as indispensable ingredients and which causes cross-linking by radical reactions to produce a silicone rubber. Of these compositions, the addition reaction type curable silicone rubber composition and the condensation reaction type curable silicone rubber composition are particularly preferred to use in viewpoint of their cure rate.

Specific examples of the filler incorporated in the above-mentioned base component include resin powders such as polycarbonate, polyethylene, nylon, polyfluoroethylene, polyacetal, polymethyl silsesquioxane, etc., and inorganic powders such as silica, zirconia, alumina, mica, calcium carbonate, magnesium carbonate, etc. Of these fillers, polycarbonate powder is the most preferred to use. These fillers may be used solely or as a mixture of two or more thereof. Although the particle size of the fillers can be suitably set in a range capable of attaining the object of the present invention, it is generally in a range of 100 μm or less, preferably 50 μm or less, and more preferably 10 μm or less.

Although the amount of the filler added can be suitably set in a range capable of attaining the purpose of the present invention, the filler is generally added in an amount of 200 parts by weight or less, preferably 100 parts or less and more preferably 1–50 parts by weight based on 100 parts by weight of the base component. If the amount of it is more than 200 parts by weight, a surface layer having good strength cannot be formed because of separation of the filler. If it is less than 1 part by weight, the effect by addition of the filler does not arise and slipping property is sometimes insufficient.

In the present invention, the non-tacky surface layer can be formed by applying the above-mentioned material in the state as it is or by diluting the above-mentioned material with an organic solvent for the purpose of controlling the viscosity so that it is easily applied. Examples of the organic solvent which is used as a diluent in the latter case include n-hexane, n-heptane, cyclohexane, gasoline for industrial use, petroleum naphtha, iso-paraffin, benzene, toluene, xylene, isopropyl alcohol, buthyl alcohol, cyclo-hexanone, methyl ethyl ketone, etc., which may be used solely or as a mixture of two or more thereof. Of these, toluene, isopropyl alcohol, methyl ethyl ketone, and mixtures of two or more of them are used especially suitably.

In each optical interconnection apparatus according to the present invention, the optical fibers extend out from desired positions (ports) on opposite end faces of the optical interconnection apparatus so that end portions are formed. Optical connectors are attached on the end portions, or the end portions are arc-fusion-spliced with optical fibers interconnected to optical connectors. No particular limitation is imposed on the optical connectors interconnected to the optical interconnection apparatus according to the present invention, but optical single-fiber or multiple-fiber small connectors can be chosen suitably. Examples can include MPO optical connectors, MT optical connectors, MU optical connectors, FPC optical connectors [NTT R&D, Vol. 45, No. 6, page 589].

The optical interconnection apparatus of the first embodiment according to the present invention can be fabricated as will be described next. For example, an adhesive sheet is firstly produced by forming the above-mentioned adhesive layer on one side of a flexible film substrate having a two-dimensional plane. Optical fibers are then routed in a desired pattern by the above-described adhesive layer. At this time, the opposite ends of the optical fibers are located extending out from the film substrate such that they can be adapted as end portions for permitting optical interconnections with optical connectors or the like. As a process for arranging the adhesive layer, it is possible to adopt a process, in which the adhesive layer is arranged by coating an adhesive, either as it is or in the form of a coating material dissolved in a solvent, on the film substrate by a method such as roll coating, bar coating, blade coating, casting, dispenser coating, spray coating or screen coating, or a process in which an adhesive sheet with the adhesive layer formed in advance on a release film is laminated on the film substrate and the release film is then removed. For the adhesive layer, a suitable thickness can be chosen and used depending on the diameter of optical fibers to be routed. Its thickness is set generally in a range of from 1 $\mu$m to 1 mm, preferably from 5 to 500 $\mu$m, more preferably from 10 to 300 $\mu$m.

Then, the protective resin layer is formed on the optical fibers routed as described above using a silicone based rubber-like or gel-like material. Specifically, it can be formed by arranging an edge-dam along or in the vicinity of the peripheral edges of the substrate, filling a silicone-based material inside the thus-formed edge-dam and then curing it there. Examples of the process for filling the silicone based material inside the edge-dam include a process in which a silicone-based material is formed into a coating material by dissolving it in a suitable solvent and the coating material is then added dropwise and dried or cured by heating, and a process in which a silicone based material in a liquid form is added dropwise and is solidified by curing with heat or at room temperature or curing by applying moisture or by irradiating ultraviolet rays.

It is generally sufficient to form a suitable shape if the edge-dam is arranged along or in the vicinity of the peripheral edges of a substrate. However where optical components such as optical connectors, optical modulators, optical devices or the like are mounted in the vicinity of the peripheral edge of the film substrate, these optical components may be able to play the role of an edge-dam. In such a case, it is no longer necessary to arrange an edge-dam at the areas where the optical components are mounted.

The material for forming the edge-dam is not limited to any specific one, and preferably, can be selected suitably depending on the application purpose of the optical interconnection apparatus. In particular, a nonwoven fabric made of organic fibers such as polyethylene, polypropylene or nylon fibers, a nonwoven fabric of glass fibers, or a sealing compound (sealer) of a silicone-base, epoxy-base, urethane-base or acrylic resin can be used suitably. No limitation is imposed on the size and shape of the edge-dam insofar as it can prevent the resin material, which is to be filled inside the edge-dam, from flowing out.

Depending on the diameter of the routed optical fibers and the overlapped number of the routed optical fibers, a suitable thickness may be chosen for the protective resin layer so that the optical fibers can be protected and held in place. In general, a thickness of (the diameter of optical fibers)×(the number of overlapped fibers) or greater is needed.

If necessary, a protective resin layer can be formed on the back of the substrate. In such a case that any optical fibers are not routed, a thickness of the protective resin layer of such an extent as reducing the stiffness of the film substrate may be chosen suitably depending on the application purpose of the optical interconnection apparatus. In general, the thickness is set within a range of from about 1 $\mu$m to several centimeters, preferably from 10 $\mu$m to 10 mm, and more preferably from 30 $\mu$m to 1 mm.

Moreover, the optical interconnection apparatus of the present invention can be fabricated by providing an adhesive layer on the back of a substrate by the same manner as described above, routing optical fibers on the adhesive layer in a desired pattern, and forming then on the routed optical fibers a resin protective layer composed of a silicone-based rubber-like or gel-like material which is the same as or different from that of the above-mentioned protective resin layer.

A non-tacky surface layer is formed on the protective resin layer formed as described above to produce an optical interconnection apparatus according to the present invention. Formation of the non-tacky surface layer on the protective resin layer can be carried out by a process which comprises preparing a coating material by dissolving materials for forming the non-tacky surface layer in a solvent, applying it on the protective resin layer, and drying or curing with heat, or by a process which comprises applying materials for forming the non-tacky surface layer, which are in a liquid state, on the protective resin layer, and drying or curing with heat. As a method of applying the materials for forming a non-tacky surface layer, spray coating, dip coating, brush coating, roll coating, etc. are usable.

The non-tacky surface layer is made to have a thickness capable of giving suitable non-tackiness according to the purpose of use. However, the thickness of it is preferred to be set up so that a kinetic friction coefficient is 3 or less, preferably 2 or less, and more preferably 1 or less, in order to make handling easy without causing attaching, fixing or adhering, when the non-tacky surface is come in contact with each other or with other materials. When the kinetic friction coefficient exceeds 3, tackiness cannot be improved. Therefore, when the optical interconnection apparatus is come in contact mutually or with other material, handling becomes difficult because of causing attaching, fixing or adhering. Thus, workability becomes remarkably bad when installing the optical interconnection apparatus in a very narrow space such as in a rack or board. In general, the non-tacky surface layer becomes to have a thickness of from 0.1 μm to 0.5 mm.

Measurement of a kinetic friction coefficient can be performed by the following methods. A sample is produced by forming a layer of silicone based rubber-like or gel-like material having a thickness of 1 mm on a side of a 100 μm thick PET film, and forming then a non-tacky surface layer using a material which gives non-tackiness, on the surface of the formed layer. The above-mentioned sample is then cut in the size of 15 cm×3 cm to prepare three or more test strips composed of the silicone sheet.

A tensile testing machine and a jig which is capable of pulling in the tensile testing machine at 900 are prepared for testing. A board (16 cm×4 cm) of SUS304 is placed on the jig, and the test strip is then placed on the SUS board so that a non-tacky surface layer may touch the SUS board. An end of the test strip is fixed by an upper grip of the tensile testing machine, and a weight of 200 g (diameter: 2.54 cm) is placed on nearly center at 5 cm from the other end. Then, it is pulled 10 cm distance at a rate of 100 mm/min, and kinetic friction force is calculated by averaging values of the measured friction force of the level part (about 7 cm) after the maximum value. A kinetic friction coefficient is obtained as follows.

The values of kinetic force measured as described above are divided by the number of test strips measured, and an average value thereof is calculated. The resulted value is divided by 200 g of the weight to obtain a kinetic friction coefficient.

The optical interconnection apparatus of the second embodiment according to the present invention can be fabricated as will be described next. An adhesive sheet is first prepared by forming an adhesive layer on a release film, and optical fibers are routed in a desired pattern on the adhesive layer. Then, a protective resin layer is formed on the routed optical fibers. In concrete, the first protective resin layer is formed by arranging an edge-dam along or in the vicinity of the peripheral edges of the release film, and using a silicone-based rubber-like or gel-like material for producing an flexible protective resin layer. The release film on the back side is then removed. A second protective layer is thereafter formed on the exposed the first protective resin layer by arranging an edge-dam along or in the vicinity of the peripheral edges, and using a silicone-based material which is the same as or different from that of the first protective resin layer. On the resulted first and second protective resin layers, a non-tacky surface layer that is the same as described above is formed respectively, whereby the optical interconnection apparatus according to the present invention is fabricated.

In the above-mentioned case, after the first protective resin layer is formed and the release film is removed, other plural optical fibers may be routed by the same manner as described above on the exposed first protective resin layer via an adhesive layer. The second protective resin layer is then formed by arranging an edge-dam on the routed optical fibers and using a silicone-based material which is the same as or different from that of the first protective resin layer. Thus, an optical interconnection apparatus having a stacked structure of optical fiber layers can be fabricated.

Further, an optical interconnection apparatus according to the present invention can also be produced by a process which comprises fabricating plural optical interconnection apparatus without providing a non-tacky surface layer in advance by the above-described process, forming directly an adhesive layer on the surface of the protective resin layer or forming an adhesive layer by laminating it onto the surface of the protective resin layer from an adhesive sheet on which the adhesive layer has been arranged in advance, adhering these optical interconnection apparatus each other to form a stacked structure having a multi-layer structure, and then forming a non-tacky surface layer on the protective resin layer of both sides of the resultant a stacked structure. Thus, an optical interconnection apparatus composed of a stacked structure having a greater multi-layered structure can also be fabricated.

In each of the optical interconnection apparatus according to the present invention fabricated as described above, optical components such as optical connectors or optical modules are interconnected to the outwardly-extended end portions of the optical fibers. For example, the end portions of the optical fibers, said end portions having been subjected to endface treatment to attach optical connectors, are interconnected to the optical connectors, or endfaces of the optical fibers fixed to optical connectors and endfaces of respective optical fibers located extending out from the optical interconnection apparatus are arc-fusion-spliced to each other.

EXAMPLE

Hereafter, the present invention will be illustrated with reference to examples. The present invention however is not restricted to them.

Example for Testing

Silicone rubbers (TSE399 and TSE3033, manufactured by Toshiba Silicone Co.) were added dropwise respectively on a side of a 100 μm thick polyethylene terephthalate (PET) film so as to have a thickness of 1 mm after curing. After the silicone rubbers were cured (conditions: at 25° C. for 24 hours in the case of TSE399, and at 150° C. for 30 minutes in the case of TSE3033), the surface of the silicone rubber layer was coated with a material for giving non-stickiness shown in Table 1 by spray coating to prepare samples whose a coating amount after drying was as shown in Table 1. The resultant samples composed of a silicone rubber sheet was then cut in the size of 15 cm×3 cm to prepare 6 test strips.

Next, kinetic friction coefficient of the above-mentioned three test strips was calculated by measuring by means of a tensile testing machine according to the above-mentioned method. In addition, samples prepared by piling up a SUS304 board on a non-tacky surface of the above-mentioned test strip, and samples prepared by piling up the above-mentioned test strips so as to face a non-tacky surfaces thereof were prepared. After these samples were allowed to leave for 30 minutes, the degree of the fixing and adhesion of them was evaluated.

TABLE 1

| Silicone rubber | Material for forming non-tacky surface layer | Coating amount (g/m$^2$) | Kinetic friction coefficient | Fixing or adhesion of silicone rubber to SUS304 board and silicone rubber |
|---|---|---|---|---|
| TSE399 | Nothing | 0 | Not less than 5.0 *1) | difficult to peel off |
| | HS-1 *2) | 1.5 | 4.0 | difficult to peel off |
| | (Curable silicone resin | 2.0 | 2.2 | peel off by a slight force |
| | containing fine particles) | 3.0 | 1.3 | peel off by little force |
| | HS-3 *3) | 1.0 | 3.5 | difficult to peel off |
| | (Curable silicone resin | 1.5 | 1.9 | peel off by little force |
| | containing fine particles) | 2.0 | 0.9 | peel off easily |
| | SR-2306 *4) | 1.0 | 2.5 | peel off by a slight force |
| | (Curable silicone resin) | 1.5 | 1.5 | peel off by little force |
| | | 2.0 | 0.7 | peel off easily |
| TSE3033 | Nothing | 0 | Not less than 5.0 *1) | difficult to peel off |
| | SR-2306 | 0.3 | 2.1 | peel off by a slight force |
| | (Curable silicone resin) | 1.0 | 0.7 | peel off easily |
| | | 2.0 | 0.5 | peel off easily |
| | SR-2316 *5) | 0.3 | 2.0 | peel off easily |
| | (Curable silicone resin) | 1.0 | 0.6 | peel off easily |

*1) The silicone rubber sheet adhered to the SUS board and did not move by tensile force of 1000 g.
*2) Coating material HS-1 was composed of HS-1 (base ingredient)/XC39-B3399 (cross-linking agent)/XC9603 (adhesive assistant)/YC6831 (catalyst)/toluene (=10/0.4/5/0.7/40 parts by weight) (product of Toshiba Silicone Co., Ltd.)
*3) Coating material HS-3 was composed of HS-3 (base ingredient)/XC9603 (adhesive assistant)/YC6831 (catalyst)/toluene (=10/2.5/0.3/10 parts by weight) (product of Toshiba Silicone Co., Ltd.)
*4) SR-2306: Product of Dow Corning Toray Co., Ltd.
*5) SR-2316: Product of Dow Corning Toray Co., Ltd.

It was understood from the results shown in Table 1, that the kinetic friction coefficient of the non-tacky surface layer was preferred to be in a range of 3.0 or less, more preferably 2.0 or less and particularly 1.0 or less, in order to make handling easy without causing attaching, fixing and adhering when it is come in contact with each other or with other materials.

Example 1

An acrylic adhesive was applied to a side of a polyimide film of 125 μm in thickness so as to be a thickness of 100 μm to prepare a film substrate (size: 120 mm×100 mm). On the film substrate, optical fibers (product of The Furukawa Electric Co., Ltd., 250 μm in diameter) were routed per port (an exit of optical fibers from an optical interconnection apparatus) as follows. Namely, 4 optical fibers were arranged in parallel with each other at pitches of 250 μm per port, and 4 ports (each port was formed of 4 optical fibers) were formed at pitches of 30 mm on each of opposite sides, i.e., longer sides of the polyimide film. Each optical fiber was routed extending from one of the longer sides of the polyimide film to the other longer side. The routing to the individual ports on the opposite sides was designed such a manner that each of the optical fibers intersected in the central part of the sheet and the maximum overlapped number of optical fibers was 4 fibers.

Around the polyimide film with the optical fibers routed thereon, an edge-dam of 1.5 mm in width and 1.2 mm in height was then formed with a silicone-base sealing compound (product of KONISHI CO., LTD., "BATH BOND"). A silicone gel coating material (product of Dow Corning Toray Silicone Co., Ltd., "SE 1880") was thereafter added dropwise to the inside of the edge-dam, and the silicone gel was cured under conditions of 120° C. and 1 hour, whereby optical fibers were held by a silicone-based protective resin layer.

As a coating material for forming a non-tacky surface layer, a composition consisting of HS-1 (base ingredient)/XC39-B3399 (cross-linking agent)/XC9603 (adhesive assistant)/YC6831 (catalyst)/toluene (=10/0.4/5/0.7/40 parts by weight) (all of them: products of Toshiba Silicone Co. Ltd.) was then applied to the formed protective resin layer by spray coating so as to be a coating amount of 2.0 g/m$^2$, whereby an optical circuit board of 1.4 mm in thickness was fabricated. MU connectors were then attached on the outwardly-extended ends of the optical fibers to obtain an optical circuit board as a final product.

The fabricated optical circuit board was pliable and flexible, since the protective resin layer was composed of a silicone gel and a non-tacky surface layer composed of silicone-based material was formed on the surface of the silicone gel. Furthermore, in the fabricated optical circuit board, the adhesion of the protective resin layer composed of silicone gel to the non-tacky surface layer composed of silicone-based material was excellent but the optical circuit board did not adhere or fix to a surface of other materials such as metal, high polymer (plastic), glass, etc. Therefore, even if it contacted with a surface of other materials, the non-tacky surface layer was not damaged. As a result, even if used as an optical circuit board between the boards placed in a very narrow space in a rack, the optical circuit board could be easily placed in a predetermined position without gaining injury. Furthermore, interconnection of it to the connectors that were attached to optical fibers extending out from other optical components could be easily carried out.

A loss of all the interconnected optical fibers was measured. It was found to be 0.3 dB or less including losses due to the insertion to the optical connectors. With respect to the optical circuit board so fabricated, there were conducted a damp heat test (the board was left over for 5,000 hours at 75° C. and 90% RH) and a heat cyclic test (−40° C. to 75° C., 500 cycles). Variations and fluctuations in optical loss were both 0.3 dB or less. The optical circuit boards were therefore found to be satisfactorily usable as optical interconnection apparatus.

Example 2

A first protective resin layer was formed on the routed optical fibers in a similar manner as in Example 1 except that a silicone rubber coating material (product of Toshiba Silicone Co.; TSE 399) was added dropwise and cured at 25° C. for 24 hours, instead of using the silicone gel coating material in Example 1.

An edge-dam of 1.0 mm in width and 0.5 mm in height was then formed around the back of the polyimide film with a silicone-base sealing compound (product of KONISHI CO., LTD., "BATH BOND"). A silicone rubber coating material (product of Toshiba Silicone Co. Ltd.; "TSE 399") was thereafter added dropwise to the inside of the edge-dam, and the silicone rubber was cured under conditions of 25° C. and 24 hours, whereby a second protective resin layer was formed.

A composition consisting of HS-3 (base ingredient)/XC9603 (adhesive assistant)/YC6831 (catalyst)/toluene (=10/2.5/0.3/10 parts by weight) (all of them: products of Toshiba Silicone Co. Ltd.), which was a coating material for forming a non-tacky surface layer, was then applied to each of the formed protective resin layers by spray coating so as to be a coating amount of 2.0 g/m$^2$ to form a non-tacky surface layer on each of the first and the second protective resin layers, whereby an optical circuit board of 1.9 mm in thickness was fabricated. MU connectors were then attached on the outwardly-extended ends of the optical fibers to obtain an optical circuit board as a final product.

The fabricated optical circuit board was pliable and flexible, since the protective resin layers were composed of a silicone rubber and a non-tacky surface layer composed of silicone-based material was formed on the surface of the silicone rubber. Furthermore, in the fabricated optical circuit board, the adhesion of the protective resin layer composed of silicone rubber to the non-tacky surface layer composed of silicone-based material was excellent but the optical circuit board did not adhere or fix to a surface of other materials such as metal, high polymer (plastic), glass, etc. Therefore, even if it contacted with a surface of other materials, the non-tacky surface layers were not damaged. As a result, even if used as an optical circuit board between the boards placed in a very narrow space in a rack, the optical circuit board could be easily placed in a predetermined position without gaining injury. Furthermore, interconnection of it to the connectors that were attached to optical fibers extending out from other optical components could be easily carried out.

A loss of all the interconnected optical fibers was measured. It was found to be 0.4 dB or less including losses due to the insertion to the optical connectors. With respect to the optical circuit board so fabricated, there were conducted a damp heat test (the board was left over for 5,000 hours at 75° C. and 90% RH) and a heat cyclic test (−40° C. to 75° C., 500 cycles). Variations and fluctuations in optical loss were both 0.5 dB or less. The optical circuit boards were therefore found to be satisfactorily usable as optical interconnection apparatus.

Example 3

Optical fibers were routed on an adhesive sheet and a first protective resin layer was the formed thereof in a similar manner as in Example 1, except that a 75 μm thick release film was used instead of the PET film, and a silicone rubber coating material (product of Toshiba Silicone Co.; TSE 3033) was added dropwise and cured at 150° C. for 30 minutes to form a protective resin layer, instead of using the silicone gel coating material in Example 1.

After the release film was removed, a second protective resin layer was formed on the back of the adhesive layer exposed. Namely, around the back of the adhesive layer, an edge-dam of 1.0 mm in width and 0.5 mm in height was formed with a silicone-base sealing compound (product of KONISHI CO., LTD., "BATH BOND"). A silicone rubber coating material (product of Toshiba Silicone Co. Ltd.; "TSE 3033") was thereafter added dropwise to the inside of the edge-dam, and the silicone rubber was cured under conditions of 150° C. and 30 minutes, whereby a second protective resin layer was formed.

A non-tacky surface layer was then formed on each of the first and the second protective resin layers. Namely, a silicone-based coating material for giving non-tackiness (product of Dow Corning Toray Silicone Co., Ltd., SR2306) was applied so as to be a coating amount of 1.0 g/m$^2$ after drying to form a non-tacky surface layer, whereby an optical circuit board of 1.8 mm in thickness was fabricated. MU connectors were then attached on the outwardly-extended ends of the optical fibers to obtain an optical circuit board as a final product.

The fabricated optical circuit board was pliable and flexible, since there was no substrate and the protective resin layers were composed of a silicone rubber and a non-tacky surface layer composed of silicone-based material was formed on the surface of the silicone rubber. Furthermore, in the fabricated optical circuit board, the adhesion of the protective resin layer composed of silicone rubber to the non-tacky surface layer composed of silicone-based material was excellent but the optical circuit board did not adhere or fix to a surface of other materials such as metal, high polymer (plastic), glass, etc. Therefore, even if it contacted with a surface of other materials, the non-tacky surface layers were not damaged. As a result, even if used as an optical circuit board between the boards placed in a very narrow space in a rack, the optical circuit board could be easily placed in a predetermined position without gaining injury. Furthermore, interconnection of it to the connectors that were attached to optical fibers extending out from other optical components could be easily carried out.

A loss of all the interconnected optical fibers was measured. It was found to be 0.5 dB or less including losses due to the insertion to the optical connectors. With respect to the optical circuit board so fabricated, there were conducted a damp heat test (the board was left over for 5,000 hours at 75° C. and 90% RH) and a heat cyclic test (−40° C. to 75° C., 500 cycles). Variations and fluctuations in optical loss were both 0.4 dB or less. The optical circuit boards were therefore found to be satisfactorily usable as optical interconnection apparatus.

Example 4

Two optical circuit boards before formation of the non-tacky surface layers in Example 3 (optical circuit boards after formation of the second protective resin layer) were prepared in a similar manner as in Example 3.

Thereafter, a silicone-based adhesive coating material (product of Dow Corning Toray Silicone Co., Ltd., SD4592/BY24-741/SRX212) was applied on the second protective resin layer of one of the optical circuit board so as to have a thickness of 100 μm after drying. The second protective resin layer of the other optical circuit board was then allowed to laminate to the adhesive layer formed as mentioned above.

On each of two first protective resin layers of an optical circuit board manufactured as described above, a non-tacky surface layer was formed respectively in a similar manner as in Example 3 to produce an optical circuit board composed of a stacked structure of 3.7 mm in thickness. MU connectors were then attached on outwardly-extended ends of the optical fibers to obtain an optical circuit board as a final product.

The fabricated optical circuit board was pliable and flexible, since there is no base film and the protective resin layers were composed of a silicone rubber and a non-tacky surface layer composed of silicone-based material was formed on the surface of the silicone rubber. Furthermore, in the fabricated optical circuit board, the adhesion of the protective resin layer composed of silicone rubber to the non-tacky surface layer composed of silicone-based material was excellent but the optical circuit board did not adhere or fix to a surface of other materials such as metal, high polymer (plastic), glass, etc. Therefore, even if it contacted with a surface of other materials, the non-tacky surface layers were not damaged. As a result, even if used as an optical circuit board between the boards placed in a very narrow space in a rack, the optical circuit board could be easily placed in a predetermined position without gaining injury. Furthermore, interconnection of it to the connectors that were attached to optical fibers extending out from other optical components could be easily carried out.

A loss of all the interconnected optical fibers was measured. It was found to be 0.5 dB or less including losses due to the insertion to the optical connectors. With respect to the optical circuit board so fabricated, there were conducted a damp heat test (the board was left over for 5,000 hours at 75° C. and 90% RH) and a heat cyclic test (−40° C. to 75° C., 500 cycles). Variations and fluctuations in optical loss were both 0.5 dB or less. The optical circuit boards were therefore found to be satisfactorily usable as optical interconnection apparatus.

CAPABILITY OF EXPLOITATION IN INDUSTRY

As has been described above, by forming a non-tacky surface layer on the protective resin layer composed of a silicone-based rubber-like or gel-like material, the optical interconnection apparatus according to the present invention does not adhere or fix to the surface of other materials such as metal, high polymer (plastic), glass, etc. even if it is come into contact with them. In a case that a kinetic friction coefficient of the non-tacky surface layer is 3.0 or less, the effect of the present invention is remarkably exhibited. In addition, by using a silicone-based flexible and slippery coating material as a material for forming a non-tacky surface layer, adhesion to the protective resin layer composed of a silicone-based material becomes more improved. Further, since surface strength increases as compared with the silicone-based rubber-like or gel-like material, the optical interconnection apparatus itself becomes to have an improved strength, by which the surface is not injured.

Furthermore, since workability such as handling of the optical interconnection apparatus becomes easy, interconnection to other optical components is easily carried out in a limited very narrow space.

What is claimed is:

1. An optical interconnection apparatus which comprises a substrate, a protective resin layer composed of a silicone based rubber-like or gel-like material on one side or both sides of said substrate, and plural optical fibers which are two-dimensionally routed on the substrate so as to form a routing pattern having at least a crossing part, a curved part or a fiber pitch changing part and provided at ends thereof with end portions adapted to permit optical interconnections, and said optical fibers being held in place by said protective resin layer, wherein a non-tacky surface resin layer having a kinetic friction coefficient of 3 or less is provided on the surface of said protective resin layer.

2. An optical interconnection apparatus according to claim 1, wherein the non-tacky surface layer is composed of a silicone-based material.

3. An optical interconnection apparatus according to claim 2, the non-tacky surface layer contains a filler.

4. An optical interconnection apparatus according to claim 1, wherein the protective resin layer is formed by filling a silicone rubber-like and/or gel-like material inside an edge-dam arranged along or in a vicinity of a peripheral edge of a substrate, a release film or another protective resin layer.

5. An optical interconnection apparatus which comprises at least two protective resin layers composed of a silicone based rubber-like or gel-like material and plural optical fibers which are two-dimensionally routed so as to form a routing pattern having at least a crossing part, a curved part or a fiber pitch changing part and provided at ends thereof with end portions adapted to permit optical interconnections, and said optical fibers being held in place by at least one of said protective resin layers, wherein a non-tacky surface resin layer having a kinetic friction coefficient of 3 or less is provided on the surface of each of said protective resin layers.

6. An optical interconnection apparatus according to claim 5, wherein two or more protective resin layer are laminated via an adhesive.

7. An optical interconnection apparatus according to claim 5, wherein the non-tacky surface layer is composed of a silicone-based material.

8. An optical interconnection apparatus according to claim 7, wherein the non-tacky surface layer contains a filler.

9. An optical interconnection apparatus according to claim 5, wherein the protective resin layer is formed by filling a silicone rubber-like and/or gel-like material inside an edge-dam arranged along or in a vicinity of a peripheral edge of a substrate, a release film or another protective resin layer.

* * * * *